United States Patent [19]
Jensen

[11] Patent Number: 5,670,981
[45] Date of Patent: Sep. 23, 1997

[54] METHOD FOR MAPPING A SOURCE PIXEL IMAGE TO A DESTINATION PIXEL SPACE

[75] Inventor: Philip E. Jensen, Bellvue, Colo.

[73] Assignee: Hewlett-Packard Company, Palo Alto, Calif.

[21] Appl. No.: 593,104

[22] Filed: Jan. 30, 1996

[51] Int. Cl.$^6$ ........................................ G09G 5/00
[52] U.S. Cl. ........................................ 345/118; 395/133
[58] Field of Search ........................ 345/118, 119, 345/112, 115; 395/133, 134, 141, 143, 136; 382/241, 256, 293

[56] References Cited

U.S. PATENT DOCUMENTS

| | | | |
|---|---|---|---|
| 4,811,241 | 3/1989 | Liang | 345/118 |
| 5,031,114 | 7/1991 | Yamagami | 345/118 |
| 5,040,130 | 8/1991 | Chang et al. | 345/118 |
| 5,195,177 | 3/1993 | Kamiyama et al. | 345/118 |

*Primary Examiner*—Dennis-Doon Chow

[57] ABSTRACT

A method for mapping a source pixel image to a destination pixel space enables all destination pixels within boundaries of the source image to be rendered in a single pass. The method first derives source image edge intersection coordinate values in the destination pixel space, for both a primary edge and a secondary edge of the source pixel image. One of the source coordinate values is selected as a starting coordinate. The method next determines a first occurring line of destination pixels in a direction along a major axis from the starting coordinate. Clip points are derived at intersections of the first occurring line of destination pixels and the primary and secondary edges of the source data. The same action is performed with respect to a next occurring line of destination pixels. A display value is then assigned to each pixel in a first minor direction along the first occurring line of destination pixels until a next destination pixel exceeds a clip point. A display value is then assigned to a pixel along the next occurring line of destination pixels which falls within the clip points previously derived for the next occurring line. A display value is assigned to each pixel in a second minor direction along the next occurring line until a next destination pixel exceeds a clip point. The process is repeated for each next occurring line of pixels falling within bounds of the source pixel image, with the minor direction reversing at each next occurring line of destination pixels.

6 Claims, 7 Drawing Sheets

METHOD FOR MAPPING A SOURCE PIXEL IMAGE TO A DESTINATION PIXEL SPACE

FIELD OF THE INVENTION

This invention relates to raster graphics displays and, more particularly, to a method for mapping a source pixel image to a destination pixel space, wherein all destination pixels within a bounding source image boundary are rendered in a single pass.

BACKGROUND OF THE INVENTION

Raster image displays often include a means for converting a source image, at one resolution, to a destination image at another resolution. Such a conversion procedure is time consuming when a scan conversion of a high resolution image is performed, especially when a software scan conversion procedure is used. The use of hardware to perform such a scan conversion is also known, however, when performing a conversion operation using hardware, it is necessary to have a simple, deterministic approach to stepping through discrete destination pixels that are bounded by source data points. More specifically, it is necessary to determine, with certainty, which destination pixels are to be "turned on" or left "off" to properly display a source image feature.

A basic task of a scan conversion procedure is to compute coordinates of pixels which lie near a source image line on a two-dimensional raster destination grid. If the source comprises lines of greater than a single pixel width, a "fill" procedure is performed wherein it is decided which pixels to turn on that are within the bounding lines of the source image, so as to best display the source image at the destination resolution.

A prior art strategy for performing a scan-conversion algorithm employs multiplications to determine the slope of the line being scan-converted. More specifically, the strategy utilized is to increment x, calculate y=mx+b, and intensify the pixel at x(increment), y. The calculation of mx is time-consuming and slows the scan conversion process.

The prior art has avoided the multiplication action by noting that if $\Delta x=1$, then $m=\Delta y/\Delta x$ reduces to $m=\Delta y$. That is, a unit change in x changes y by m, which is the slope of the line being scan-converted. Thus, for all points $(x_i, Y_i)$ on the line, it is known that if $x_i+1=x_i+1$, then $Y_i+=Y_i+m$. Thus, the next values of x and y are defined in terms of their previous values. Therefore, at each step, an incremental calculation is made, based on the preceding step.

A further method of scan conversion algorithm was suggested by Bresenham and is attractive because it only uses integer arithmetic (i.e., see "Fundamentals of Interactive Computer Graphics", Foley et al., Addison Wesley, Chapter 11, 1983). The Bresenham algorithm uses a decision variable at each step and requires multiple passes within an enclosed destination pixel space to perform an entire scan conversion action. The Bresenham procedure further requires a number of address cycles to be generated to cover situations where the scan conversion procedure moves outside of the bounds of the source image. Further, since multiple passes are required within the bounds of the source image, considerable memory is utilized during the procedure.

There is a continuing requirement for the rendering of high resolution images, particularly in medical applications, where the user is also enabled to translate, rotate and scale a displayed image. Normally, the translation, rotation and scaling actions are performed with respect to a source image, which is then scan converted to the destination resolution and displayed. To improve the speed of scan conversion, it is desirable to render all destination pixels within source image boundaries in a single pass. This, in essence, assures that it is only necessary to retain intensity information of the source data for a single pass through the destination data. The problem of determining the correct data to be used to render the destination pixels is thereby simplified.

A single pass through the destination data enables the conversion operation to use incremental address values, which greatly reduces the amount of data which must flow through an image processing subassembly. For instance, instead requiring a data location and a data value per source pixel, it is just necessary to employ a data value and "step" information to a next data location.

Lastly, the procedure must assure that all pixels are rendered and that there are no "holes" in the data. A hole is a pixel that lies within the boundaries of the source data but is not caused to "turn on" by the scan conversion procedure.

SUMMARY OF THE INVENTION

A method for mapping a source pixel image to a destination pixel space enables all destination pixels within boundaries of the source image to be rendered in a single pass. The method first derives source image edge intersection coordinate values in the destination pixel space, for both a primary edge and a secondary edge of the source pixel image. One of the source coordinate values is selected as a starting coordinate. The method next determines a first occurring line of destination pixels in a direction along a major axis from the starting coordinate. Clip points are derived at intersections of the first occurring line of destination pixels and the primary and secondary edges of the source data. The same action is performed with respect to a next occurring line of destination pixels. A display value is then assigned to each pixel in a first minor direction along the first occurring line of destination pixels until a next destination pixel exceeds a clip point. A display value is then assigned to a pixel along the next occurring line of destination pixels which falls within the clip points previously derived for the next occurring line. A display value is assigned to each pixel in a second minor direction along the next occurring line until a next destination pixel exceeds a clip point. The process is repeated for each next occurring line of pixels falling within bounds of the source pixel image, with the minor direction reversing at each next occurring line of destination pixels. The procedure terminates when no further destination pixels are available for rendering.

DETAILED DESCRIPTION OF THE INVENTION

Figure 1:
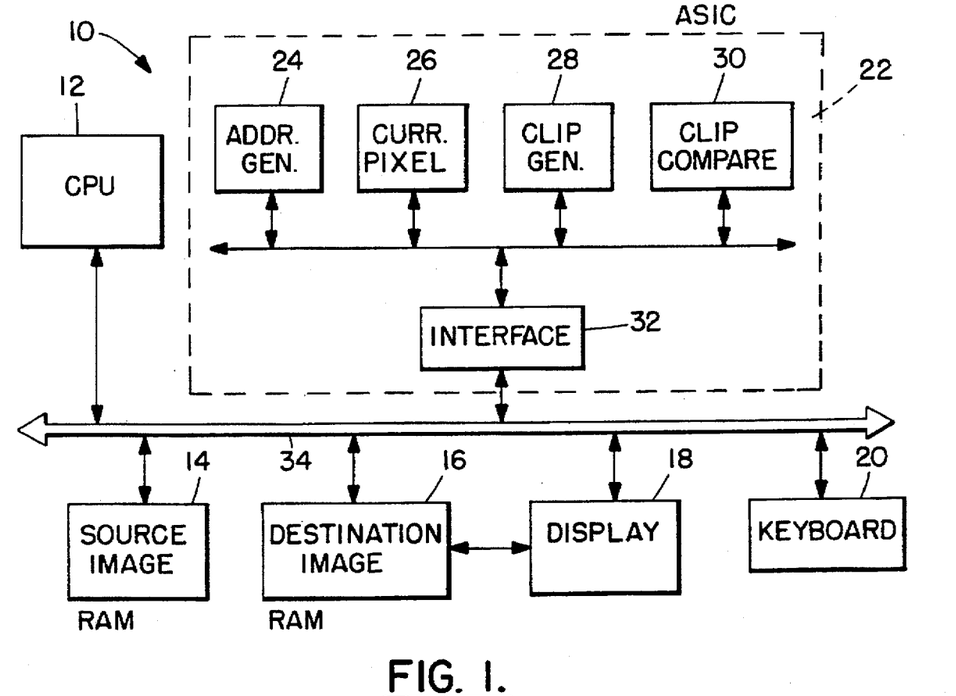
FIG. 1 is a high level block diagram of an image processing system particularly adapted to carrying out the invention.

Referring first to FIG. 1, an image processing system 10 includes a central processing unit 12, a random access memory (RAM) 14 for storing data describing a source image; a RAM 16 for storing data corresponding to a destination image and a display 18 which is controllable in accordance with destination image data to display that data for a user. A keyboard 20 enables a user to enter commands which enable rotation, translation and/or scaling of the source image.

To implement a conversion of the source image to the destination image, an application specific integrated circuit (ASIC) 22 is provided and enables hardware-controlled, single pass processing to perform the scan conversion action. The functions of each of the elements within ASIC 22 will be described in detail below; but for the present it is sufficient to understand their general functions. An address generator module 24 stores a coordinate of a base or start point in the source image and slopes of edges which intersect at the start point. A current pixel module 26 stores a coordinate value of a current pixel being processed. Clip generator 28 and clip compare module 30 combine to enable a determination to be made as to whether a destination pixel falls within or without the boundaries of the source image, thereby enabling the system to determine which destination pixels are to be intensified to represent the converted image. An interface module 32 provides connectivity to the remaining modules of image processing system 10 via a bus 34.

As will be hereafter understood, image processing system 10 employs a single pass method to determine which pixels in a destination image space should be intensified to represent the grey scale or color value of a source image pixel. More specifically, each destination pixel falling within the boundaries of source image edges is determined and subsequently intensified in accordance with source image data. Further, the procedure steps through the destination image pixels in a serpentine manner, in such a way that no retracing of steps is required. Hereafter, the method of the invention will be described in conjunction with the example shown in FIGS. 2-8. The operation of the method of the invention will be described in conjunction with the flow diagrams of FIGS. 9-11.

Figure 2:
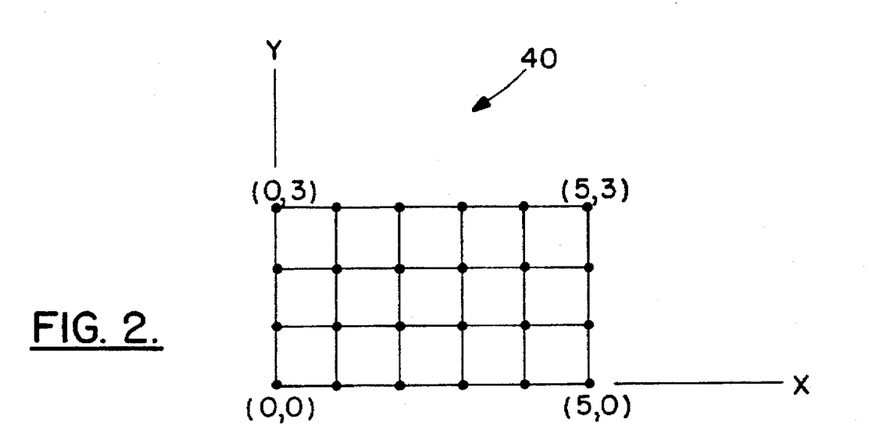
FIG. 2 is an exemplary source image that is to be rendered to a destination space.

Turning to FIG. 2, the procedure starts with a source image 40 which is comprised of an array of coordinate values arranged in a regular, non-rotated fashion. Each vertex or intersection of edges in the grid of image 40 represents an address of a data point representing some scalar value, which indicates a color intensity. The vertices shown in FIG. 2 do not, at this time, represent any particular position on a display screen or in a display space, although it is possible to think of them as being one pixel unit apart in both the X and Y coordinate directions.

To now enable image processing system 10 to convert source image 40 into a destination image for presentation on display 18, both scaling and rotation of the data are performed in accordance with user input requirements. Further, the data may be translated so that it is appropriately located in the destination display space. Such actions are known in the prior art and will not be further described here.

Figure 3:
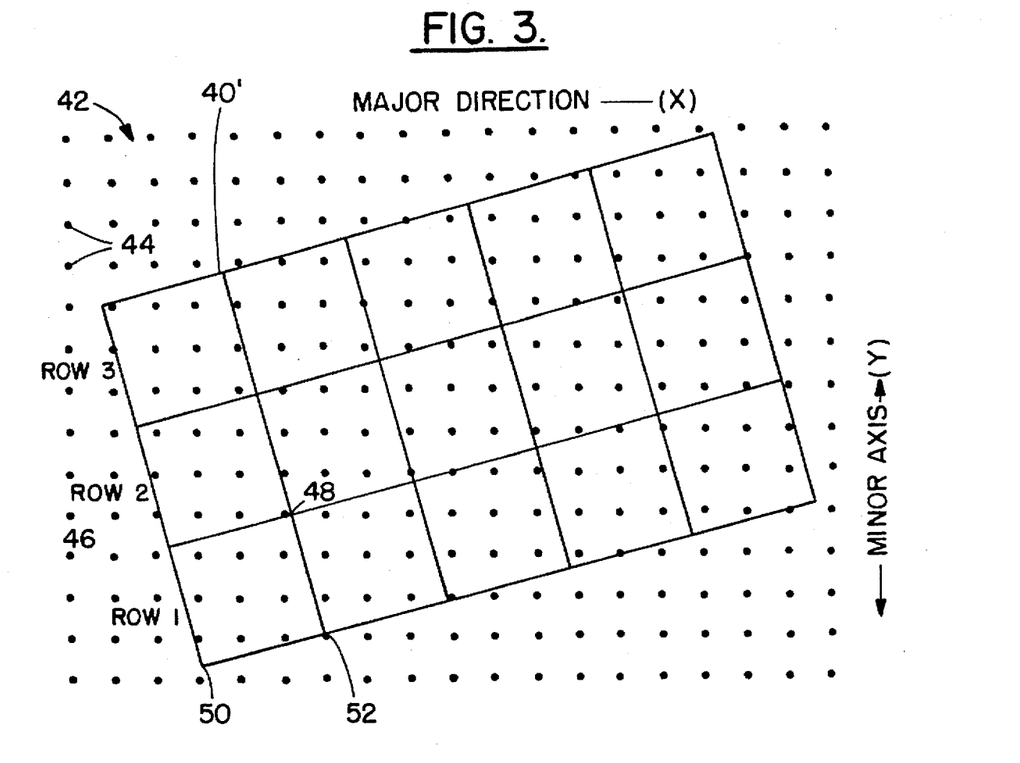
FIG. 3 is a schematic diagram of the destination space showing a translated, rotated and scaled version of the source image.

As shown in FIG. 3, it is assumed that source image 40 has been converted to image 40' by both scaling and rotation, such that its vertices are now represented by coordinate values in destination pixel space 42. Each of dots 44 represents a pixel location in destination space 42. Note, however, that edge vertices 46, 48, 50, 52, etc. do not fall directly upon any destination pixel location, but rather are represented by coordinate values in destination space 42 that are not coincident with destination pixel locations. More specifically, each of source image vertices 46, 48, 50, 52, etc. is now represented by non-integer coordinate values in destination image space 42.

To hereafter determine which of destination pixels 44 falls within the boundaries defined by the source image vertex values, one line of destination pixel data at a time is hereafter operated upon. As will be understood, each source data value is only sent down bus 34 a single time.

Prior to further describing the invention, certain terminology is to be defined. The example shown in FIGS. 2-8 illustrates a principal "drawing" direction along the X axis and a secondary drawing action along the Y axis (row 1 extends generally in the X direction and the columns of source data extend generally in the Y direction). However, the source data image can be oriented in any quadrant of the Cartesian coordinate system and thus more general terminology is required to fully define the image elements and directions of "drawing". Hereafter, the following terms will be used. Major Axis: either the X or the Y axis, depending upon the direction to be "drawn". Given a single line, this is the direction that is drawn as more and more data is received.

Minor Axis: an axis that is at a 90° angle to the major axis.

Primary: an edge (or point) which begins at the point farthest back along the major axis.

Secondary: the non-primary edge (or point).

Major Primary: the value of the major axis (X or Y) at the primary point.

Minor Primary: the value of the minor axis (X or Y) at the primary point.

Major Secondary: the value of the major axis (X or Y) at the secondary point.

Minor Secondary: the value of the minor axis (X or Y) at the secondary point.

Slope Major: the change of an edge in the minor axis for a single unit change in the major axis, along the major axis.

Slope Minor: the change of an edge in the minor axis for a single unit change in the major axis along the minor axis.

Figure 4:
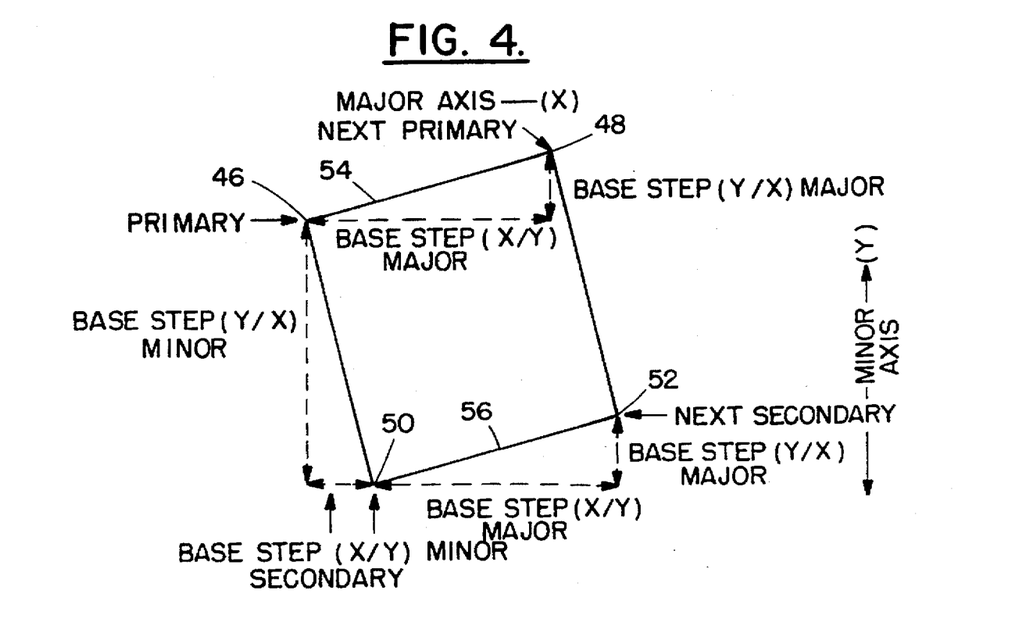
FIG. 4 is a schematic diagram of four source pixels, showing values that are employed to determine slopes of primary and secondary edges of the source image.
Figure 5:
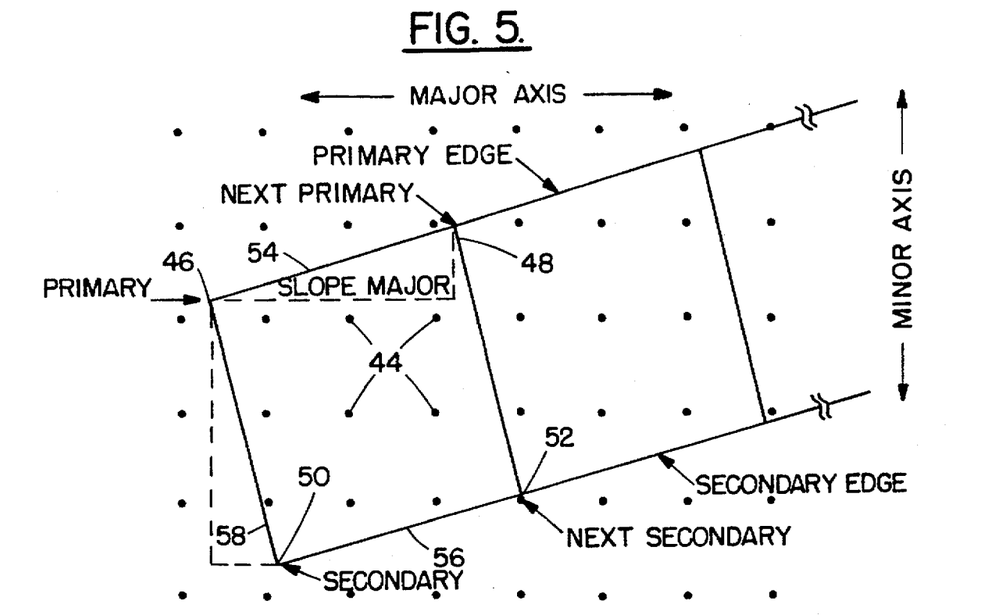
FIG. 5 is a portion of the destination space shown in FIG. 3, but expanded to show the superimposition of a portion of the source image.

FIG. 4 shows the source data (and associated edges) represented by source coordinate points 46, 48, 50 and 52. In this case, the major axis is along the X direction and the minor axis is along the Y direction. Vertex 46 is the primary point and edge 54 is the primary edge. Vertex is 50 is the secondary point and edge 56, connecting vertices 50 and 52, is the secondary edge.

It is to be noted that each of vertex points 46, 48, 50, 52, etc. is exactly the same distance apart in the major and minor directions (i.e. all areas of data are rectangles). Thus, once the address of the primary point is known, to generate other vertex values, it is only necessary to add a step value in both the X and Y directions. Initially, therefore, primary vertex 46 is assigned a coordinate value comprising Base Address X and Base Address Y. To generate the address of secondary vertex 50, it is just necessary to add the Base Step X Minor value to the Base Address X and the Base Step Y Minor value to the Base Address Y. The Base Step values are derived by knowing the amount of rotation and scaling to which image 40' has been subjected. Preferably, the Base Step values are contained in a table which is addressed in accordance with the amount of required image rotation, thereby enabling immediate access to the aforesaid values.

To generate a next primary vertex value, the Base Step X Major value is added to the X component of the primary vertex and the Base Step Y Major value is added to the Y component of the primary vertex. Similar calculations are carried out with respect to secondary vertex values.

Before deciding which of destination space pixels 44 is to be intensified so as to properly represent the source image (see FIG. 5), the slope of both primary edge 54 and secondary edge 56 is determined, as well as the slope of edge 58 along the minor direction. Both the Slope Major and Slope Minor values can be determined from the Base Step values shown in FIG. 4. Further, because there is always an integer unit distance between vertices, no multiplication action is required to determine the slope values.

Figure 6:
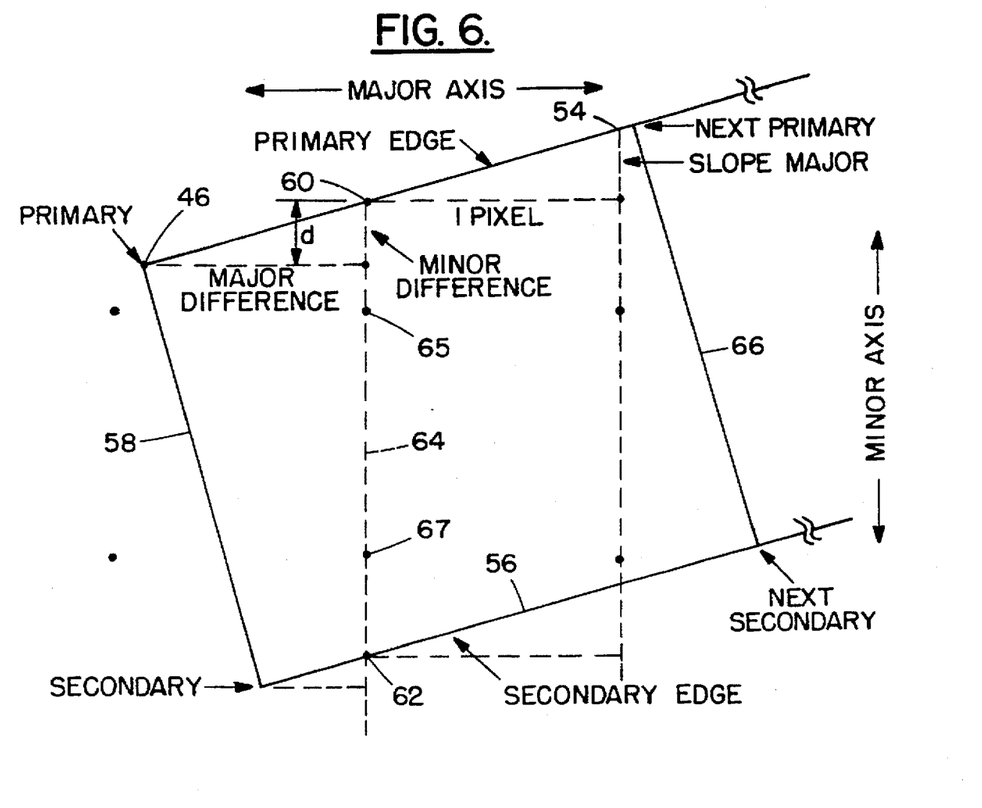
FIG. 6 is a magnified version of the source data which illustrates how clip points are derived.

In order to determine whether a destination space pixel lies within primary edge 54 and secondary edge 56, a comparison must be made of the coordinates of the destination pixel with "clip" points 60 and 62 (see FIG. 6). These clip points are indicative of intersections of a line 64 that defines the minor axis of a column of destination pixels, and primary and secondary edges 54, 56, respectively. As will be hereafter understood, the derivation of clip points 60 and 62 occurs as each succeeding line of destination pixels is considered. That is, the clip points are not calculated in advance of the processing of the individual destination pixels.

Initially, the Base Address X and Base Address Y coordinate values of primary point 46 are utilized to commence the determination of clip point 60. Initially, the distance from primary point 46 to line 64 (major difference) is calculated by taking the difference between the next higher major axis value of a destination pixel and subtracting the Base Address X value. The Major Difference is then multiplied by the Major Slope (i.e., the Minor Difference) to determine distance d. The value of d then added to the Base Address Y value to derive the value of clip point 60. Since subsequent clip points are a unit distance from clip point 60, it is just necessary to add the Major Slope to clip point 60 to generate the remaining clip points within the source data area. When a primary point is again passed, the process is repeated. The secondary edge points are generated in the same manner.

Edges must also be generated along the left and right minor edges 58 and 66. These edges are generated in a similar manner to the other edges, except that the slope used is the Minor Slope. The base point is always the primary point. When the procedure moves past the first secondary point, the Major Slope is again used. Finally, when it moves past the next primary point, the Minor Slope is again used. In such manner, as the processing of destination pixel lines (i.e. columns of pixels in this example) proceeds, clip points are determined and enable a decision to be made as to whether a destination pixel should or should not be intensified.

Figure 7:
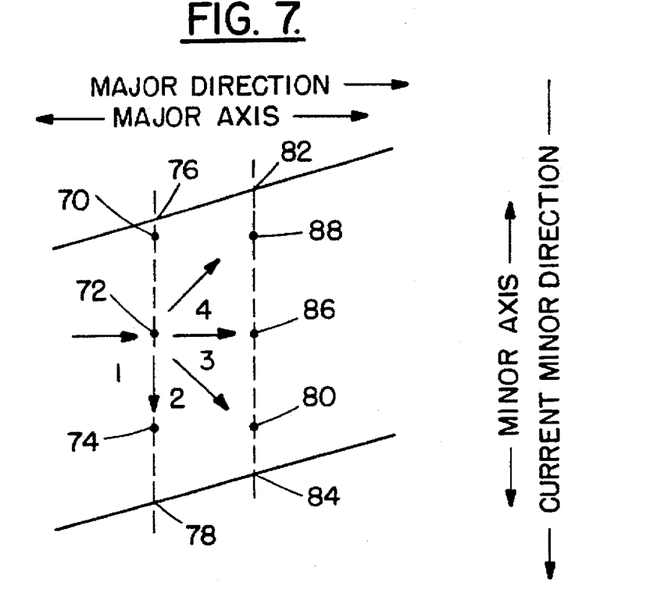
FIG. 7 is a schematic illustrating the sequence of steps that are taken from a current pixel, to determine a next pixel to be rendered by the method of the invention.
Figure 8:
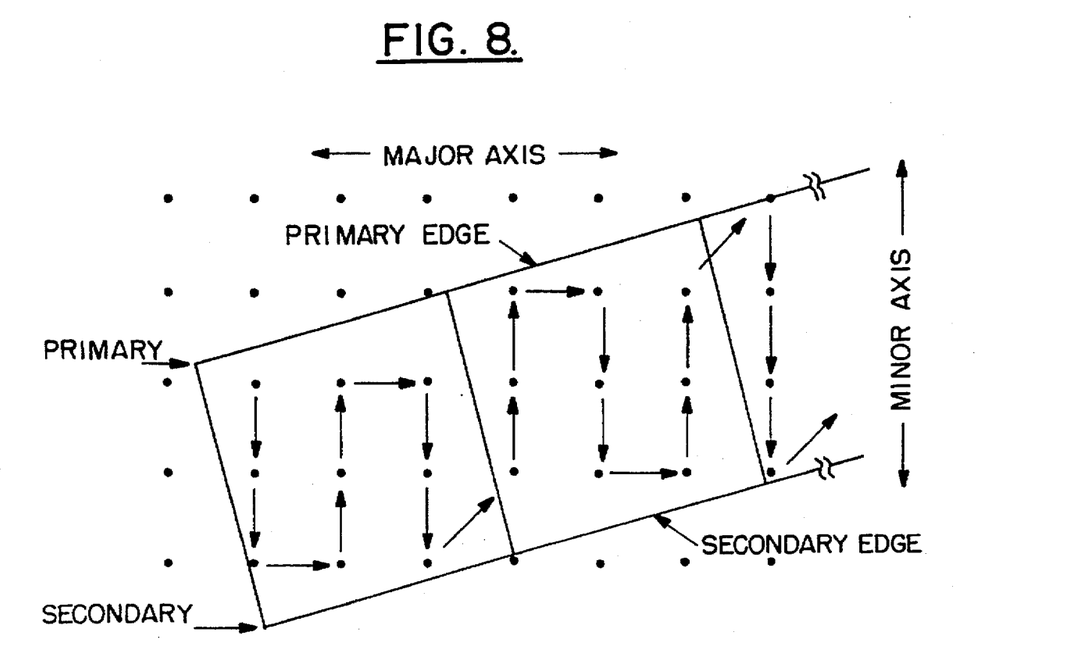
FIG. 8 illustrates the path taken by the method in rendering all destination pixels within the illustrated source image.

Turning now to FIGS. 7 and 8, the "serpentine" procedure which now enables each of the destination pixels to be sequentially accessed, processed and either intensified or ignored, will be further explained. The procedure moves through the destination pixels in a serpentine manner and never retraces its steps. This action reduces the amount of on-chip data storage random access memory by approximately 25%. Further, it minimizes the number of addresses that must be sent to output an area of data, thereby increasing the speed of the rendering. Most moves generated by the procedure are within one pixel of a current pixel.

In essence, the procedure proceeds by looking at four pixels surrounding a current pixel location. To begin, a start destination pixel is chosen. This pixel must be directly adjacent an edge, with a primary edge being preferred. The current Minor Direction is then defined by the system as the direction from the primary edge to the secondary edge. This establishes a first direction of "movement" of the procedure, from pixel to pixel.

As shown in FIG. 7, the current minor direction is down the page, and the procedure starts from destination pixel 70. Assuming that the procedure has arrived at current pixel 72, the procedure first checks a destination pixel (74) that is one increment different in the current minor direction and along the same line of pixels (i.e. having a common major axis value). It is then determined whether destination pixel 74 is within the clip points 76 and 78 (which have been previously calculated). If pixel 74 is determined to lie within the clips points, the current pixel value is incremented to destination pixel 74 and the procedure repeats. If pixel 74 is not found to be not within the boundaries of the clip points, the next pixel checked is located at the current minor position, plus one step in the current minor direction and one step further in the major direction (i.e., destination pixel 80). If destination pixel 80 is not within clip points 82, 84, the procedure checks a next destination pixel 86 that is at the same current minor position and one step along the major axis. Here again, if pixel 86 is not within clip points 82 and 84, a pixel 88 that is one step in the major direction and one step in the direction opposite to the current minor direction, is checked. Note, that if destination pixel 74 is found to be out of bounds, then the current minor direction is reversed when proceeding to the next line of pixels 80, 86, 88, etc.

As shown in FIG. 8, the procedure moves from pixel column to pixel column in a serpentine manner. At each column, the checking procedure continues in the current minor direction until the procedure can go no further, without going "out of bounds". At such point, the procedure moves to a next column of pixels, reverses the current minor direction and then proceeds to determine which pixels on that row are within the boundaries of the primary and secondary edges. The procedure continues until the entire source image area is filled by intensified destination pixels.

The procedure works for the vast majority of cases, but not all. It is therefore necessary to provide a "bail out" mechanism. First, if none of the pixels are chosen in the sequential procedure shown in FIG. 7, the procedure moves to a pixel that is one step in the major direction and closest to the primary edge (while still remaining within bounds). Second, if the pixel chosen in move 2 (shown in FIG. 7), is not immediately next to an edge, again the procedure moves to a pixel that is one step in the major direction and closest to a the primary edge. In other words, the procedure "resets", does not alter the current minor direction and moves to the topmost destination pixel that is within bounds and one step in the major direction. If there is no such destination pixel, the process repeats and moves one further step in the major direction.

Figure 9:
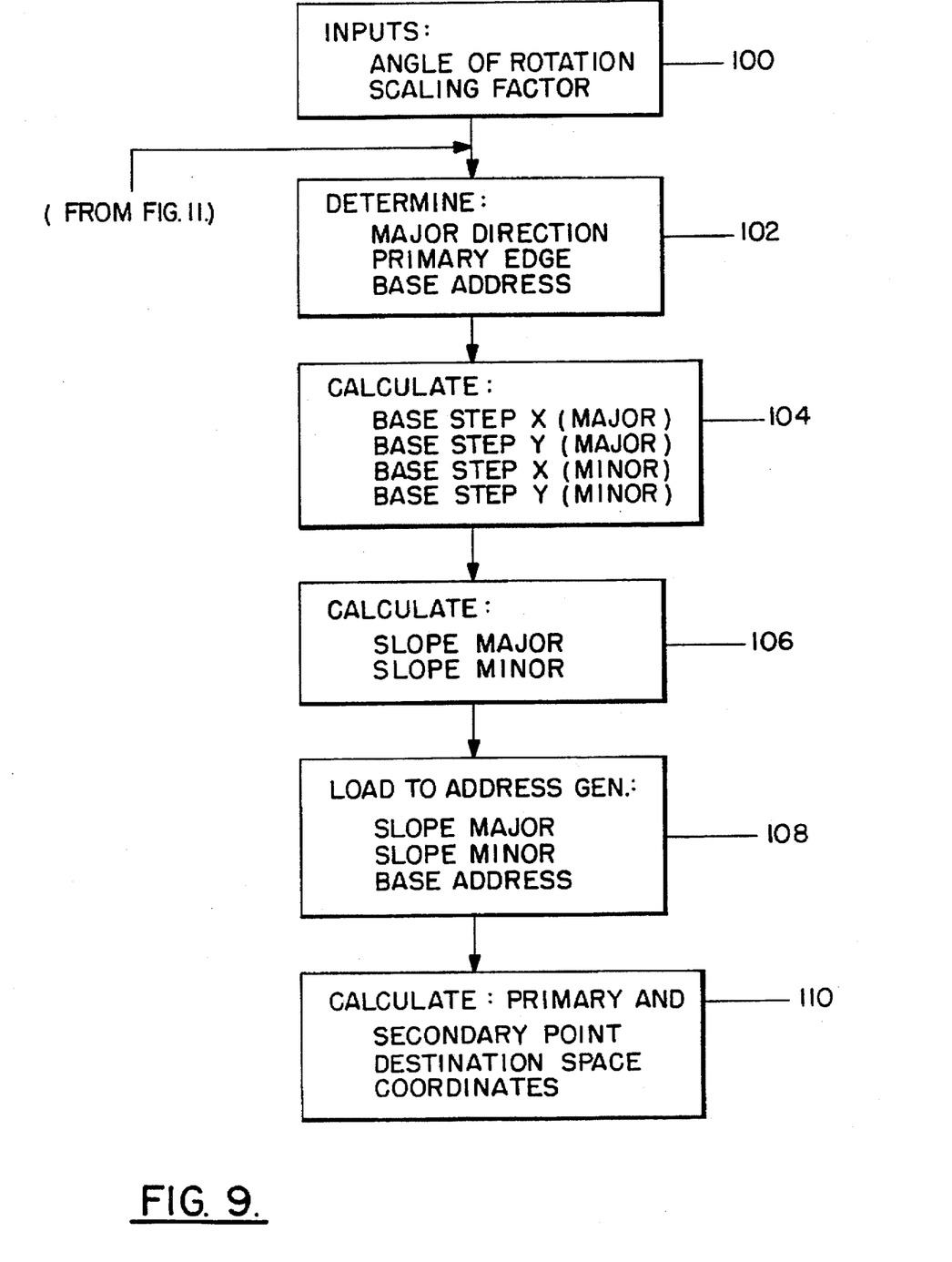
FIGS. 9-11 illustrate a logical flow diagram which describes the functioning of the system of FIG. 1 in performing the method of the invention.
Figure 10:
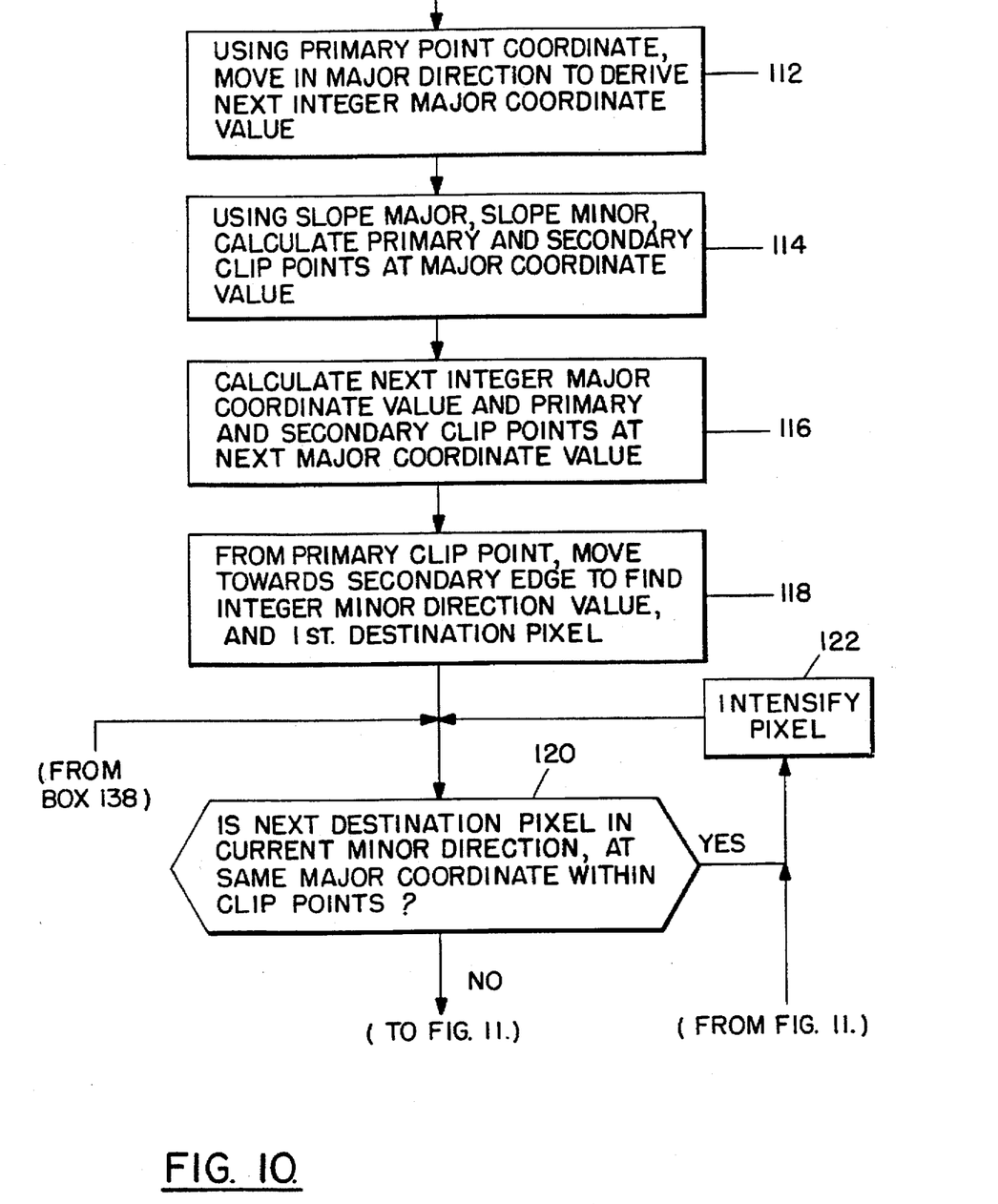
Figure 11:
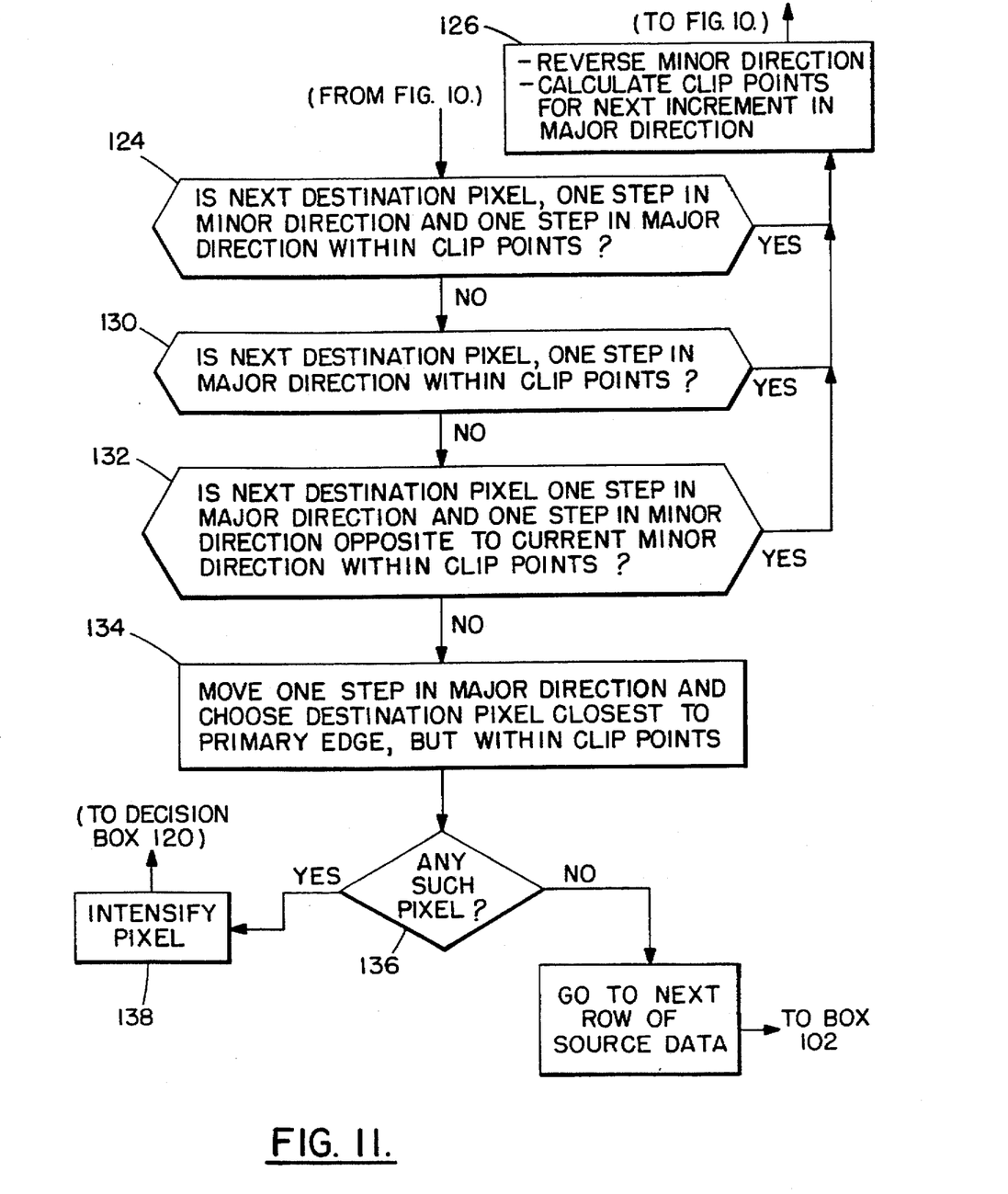

Turning now to FIGS. 9–11, the procedure employed by the invention to render the destination pixels in accordance with source image data will be hereafter described. It is preferred that any scaling action occur prior to a rotation to assure that destination coordinates remain orthogonally related after rotation. Initially, as shown in box 100, inputs to the procedure are an angular rotation of the source data and an applied scaling factor. From that input data, a software routine determines the current major direction (box 102). That direction is determined by examining the angle of rotation and determining a quadrant in which it lies. For instance, if the angle of rotation lies between +45 degrees and −45 degrees, the major direction is in the +X direction. If the angle of rotation lies within the quadrant defined by +45 degrees and +135 degrees, the major direction is in the +Y direction, etc.

Next, the primary edge is determined as the longest edge that is connected to the vertex point which is farthest back in the major direction. That point is the primary point and is assigned the base address of: Base Address X, Base Address Y.

Then, as shown in box 104, the procedure calculates Base Step X (Major); Base Step Y (Major); Base Step X (Minor) and Base Step Y (Minor). Those values are determined from the source coordinate values and enable the determination of source coordinates in destination space. Those values further enable the calculation of Slope Major and Slope Minor (box 106).

The Base Address, Slope Major, Slope Minor are then loaded into address generator 24 in FIG. 1 (box 108). Next, using the Base Address and the Base Step values determined in box 104, the primary and secondary point coordinates are determined in destination space (box 110). At this stage, data has been derived which defines the image shown in FIG. 5.

To now calculate the clip points for the first line (i.e., column) of destination pixels, the Base Address X and Base Address Y values are accessed. The procedure further "moves" in the major direction to derive a next integer major coordinate value which defines a line running through a column of destination pixels (box 112). This is the "Major Difference" shown in FIG. 6. Next, using Slope Major and Slope Minor, the primary and secondary clip points are determined as described above (box 114). The process repeats for the succeeding column of destination pixels (box 116) at a next major coordinate integer value to enable performance of the procedure.

Using a clip point as a starting point (e.g. clip point 60 in FIG. 6), the procedure moves towards secondary edge 56 (box 118) until a first destination pixel having a lesser, integer minor value is encountered (e.g. pixel 65 in FIG. 6). At this point, the procedure commences implementing the serpentine method illustrated in FIG. 7. Thus, if the next destination pixel, e.g. 67, in the current minor direction (downward) and located at the same major coordinate value, is within the primary and secondary clip points, then the destination pixel is intensified (decision box 120 and box 122).

The procedure continues moving down the column of destination pixels, and so long as further destination pixels are found which are within the primary and secondary clip points, they are successively intensified. If, however, it is found that a next destination pixel in the current minor direction is outside of a clip point, the procedure moves to decision box 124 wherein a next destination pixel, one step in the minor direction and one step in the major direction, is examined to determine if it lies within primary and secondary clip points along its column of pixels. If yes, the minor direction is reversed and calculation of clip points for the next integer increment in the major direction is performed (box 126). The pixel is then intensified (box 122), and the procedure then recycles back to decision box 120 and continues.

If the determination from decision box 124 is no, the procedure moves to decision box 130 to determine if a next destination pixel, that is one step in the major direction from the current pixel, is within the primary and secondary clip points at the major value. If yes, the minor direction is reversed and calculation of clip points for the next integer increment in the major direction is performed (box 126). The pixel is then intensified (box 122), and the procedure then recycles back to decision box 120 and continues.

If the determination within decision box 130 is no, the procedure moves to decision box 132 and finds if the next destination pixel, that is one step in the major direction and one step opposite in direction to the current minor direction, is within the clip points at the major value. If yes, the minor direction is reversed and calculation of clip points for the next integer increment in the major direction is performed (box 126). The pixel is then intensified (box 122), and the procedure then recycles back to decision box 120 and continues.

If a no issues from decision box 132, then the "bail out" procedure is implemented as above described. More specifically, the procedure moves to the destination pixel that is one step in the major direction and closest to primary edge 54 but within the clip points positioned along the column of pixels containing the aforesaid destination pixel (box 134).

If there is such a pixel (decision box 136), the pixel is intensified (box 138) and the procedure recycles back to decision box 120. If there is no such pixel, then a next row of source data is accessed and the procedure repeats (box 140).

Returning briefly to FIG. 1, the current pixel location is maintained in current pixel module 26. Clip generator 28 performs the calculations required to determine the clip point values on succeeding destination pixel columns and clip compare module 30 performs the calculations that enable determination of whether a destination pixel falls within the clip points. The resulting outputs from clip compare module 30 are fed through interface module 32 and directly into destination image RAM 16. In such manner, the destination pixels are handled in a single pass and source data is similarly handled serially.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for mapping a source pixel image to a destination pixel space manifesting a major direction axis and a minor direction axis, said method comprising the steps of:

a) deriving source image edge intersection coordinate values in said destination pixel space for both a primary edge and a secondary edge of said source pixel image, one of said coordinate values being a starting coordinate;

b) determining a first occurring line of destination pixels along said major direction axis from said starting coordinate;

c) deriving clip points at intersections of said first occurring line of destination pixels with said primary edge and said secondary edge;

d) determining a next occurring line of destination pixels along said major direction axis from said first occurring line of destination pixels;

e) deriving clip points at intersections of said next occurring line of destination pixels with said primary edge and said secondary edge;

f) assigning a display value to each pixel in a first minor direction along said first occurring line of destination pixels until a next destination pixel after a current pixel exceeds a clip point;

g) assigning a display value to a pixel along said next occurring line of destination pixels which falls within said clip points derived in step e);

h) assigning a display value to each pixel in a second minor direction along said next occurring line of destination pixels until a next destination pixel from a current pixel exceeds a clip point derived in step e); and i) repeating steps d-h for each next occurring line of pixels falling within bounds of said source pixel image, said minor direction reversing at each next occurring line of destination pixels.

2. The method as recited in claim 1, wherein said starting coordinate in step a) is positioned furthest in one direction along said major direction axis from all other source image edge intersection coordinate values.

3. The method as recited in claim 2, wherein step g) comprises the substep of:

g1) first, determining if a destination pixel that is positioned one step in said first minor direction along said next occurring line of destination pixels from a current minor position of a current pixel in said first occurring line of destination pixels, falls within said clip points derived in step e).

4. The method as recited in claim 3, wherein step comprises the substep of:

g2) second, determining if a destination pixel that is positioned one step in said major direction along said next occurring line of destination pixels, concurrent with a minor position of said current pixel of step g1, falls within said clip points derived in step e).

5. The method as recited in claim 4, wherein step g) comprises the substep of:

g3) third, determining if a destination pixel that is positioned one step in said second minor direction along said next occurring line of destination pixels, from a minor position of said current pixel of step g1, falls within said clip points derived in step e).

6. The method as recited in claim 5, wherein, if none of the destination pixels considered in substeps g1, g2, or g3 fall within said clip points derived in step e), performing the following step of:

j) assigning a display value to a pixel which lies closest to said primary edge in said next occurring line of destination pixels and is within said clip points derived in step e for said next occurring line.

* * * * *